US 6,678,626 B2

(12) United States Patent
Fallon et al.

(10) Patent No.: US 6,678,626 B2
(45) Date of Patent: Jan. 13, 2004

(54) POWER ON SELF TEST (POST) AND EXTENDED SELF TEST (EST) FOR ULTRASONIC IMAGING SYSTEM

(75) Inventors: Joseph R Fallon, Boxford, MA (US); Thomas P. McKernan, Hampton, NH (US); William R. Martin, Westford, MA (US); Melissa A. Powell, Londonderry, NH (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 56 days.

(21) Appl. No.: 09/919,466

(22) Filed: Jul. 31, 2001

(65) Prior Publication Data

US 2003/0028341 A1 Feb. 6, 2003

(51) Int. Cl.[7] .............................. G06F 19/00; A61B 8/00
(52) U.S. Cl. ........................ 702/117; 702/113; 702/108; 600/437; 73/596
(58) Field of Search ................................ 702/108, 113, 702/115, 116, 117, 119, 57, 58, 118, 120, 123, 124, 182, 185; 73/606, 607, 618, 620, 596; 367/137, 138; 600/437–472

(56) References Cited

U.S. PATENT DOCUMENTS

| 4,700,711 A | * | 10/1987 | Carlson ....................... 600/449 |
| 4,819,154 A | * | 4/1989 | Stiffler et al. ................. 714/20 |
| 4,941,143 A | * | 7/1990 | Twitty et al. ................ 370/445 |
| 5,265,613 A | * | 11/1993 | Feldman et al. ............ 600/453 |
| 5,524,624 A | * | 6/1996 | Tepper et al. ................ 600/439 |
| 5,817,024 A | * | 10/1998 | Ogle et al. .................. 600/447 |
| 6,417,857 B2 | * | 7/2002 | Finger et al. ................. 345/505 |
| 6,450,958 B1 | * | 9/2002 | Linkhart et al. ............ 600/437 |
| 6,585,644 B2 | * | 7/2003 | Lebel et al. ................. 600/300 |
| 2002/0129654 A1 | * | 9/2002 | Hongerholt ................... 73/596 |

FOREIGN PATENT DOCUMENTS

| JP | 06154211 A | * | 6/1994 | ............ A61B/8/00 |
| JP | 08238243 A | * | 9/1996 | ............ A61B/8/00 |

* cited by examiner

Primary Examiner—Marc S. Hoff
Assistant Examiner—Jeffrey R West
(74) Attorney, Agent, or Firm—John Vodopia

(57) ABSTRACT

An ultrasonic imaging system including a power on self test (POST) and an extended self test (EST). The POST includes (a) a verification test, (b) a register test (c) a controller test, (d) a receive digital signal path test and (e) a basic front end test. The POST is initiated, performed and completed within a short time, such as three seconds, from power ON. The EST is performed after the POST at the discretion of an operator, and includes a transmit test, a transducer element test, a front end voltage test and a receive test.

21 Claims, 4 Drawing Sheets

US 6,678,626 B2

POWER ON SELF TEST (POST) AND EXTENDED SELF TEST (EST) FOR ULTRASONIC IMAGING SYSTEM

BACKGROUND OF THE INVENTION

1. Field of the Invention

The present invention relates to a power on self test (POST) and an extended self test (EST) for an ultrasonic imaging system, to determine with high confidence in a relatively short time period (for example, less than three seconds) that the ultrasonic imaging system is functioning correctly.

2. Description of the Related Art

Ultrasonic imaging systems are widely used to produce an image of inside a person's body.

FIG. 1 is a diagram illustrating the general concept of an ultrasonic imaging system. Referring now to FIG. 1, an ultrasonic imaging system 18 typically includes electronics 20 and a transducer 22. Electronics 20 produces control signals for transducer 22. In accordance with the control signals, transducer 22 transmits ultrasonic energy 24 into tissue 26, such as that, for example, in a human body. Ultrasonic energy 24 causes tissue 26 to generate a signal 28 which is received by transducer 22. Electronics 20 then forms an image in accordance with the received signal 28.

Conventional ultrasonic imaging systems typically employ embedded resident self-diagnostic tests to ensure proper operation. However, conventionally, diagnostic tests are not implemented in an expeditious manner.

SUMMARY OF THE INVENTION

The present invention provides an ultrasonic imaging system including a power on self test (POST) which is initiated, performed and completed within three seconds of power ON.

The present invention also provides an ultrasonic imaging system having a POST including (a) a verification test copying run-time code from a first on-board memory to a second on-board memory and verifying that the copied run-time code has been copied correctly, (b) a register test testing registers included in an application specific integrated circuit (ASIC) for performing ultrasonic scanning, (c) a controller test testing operation of a controller which generates a real-time clock and controls input/output operations during ultrasonic scanning, (d) a receive digital signal path test testing a receive digital signal path of the ultrasonic imaging system, and (e) a basic front end test.

Moreover, the present invention provides an ultrasonic imaging system including a power on self test (POST) and an extended self test (EST). The POST is initiated, performed and completed within three seconds of power ON. The POST includes at least one of the group consisting of a verification test, a register test, a controller test, a receive digital signal path test and a basic front end test. The EST is performed at the discretion of an operator after completion of the POST. The EST includes at least one of the group consisting of a transmit test, a transducer element test, a front end voltage test and a receive test.

Advantages of the invention will be set forth in part in the description which follows, and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
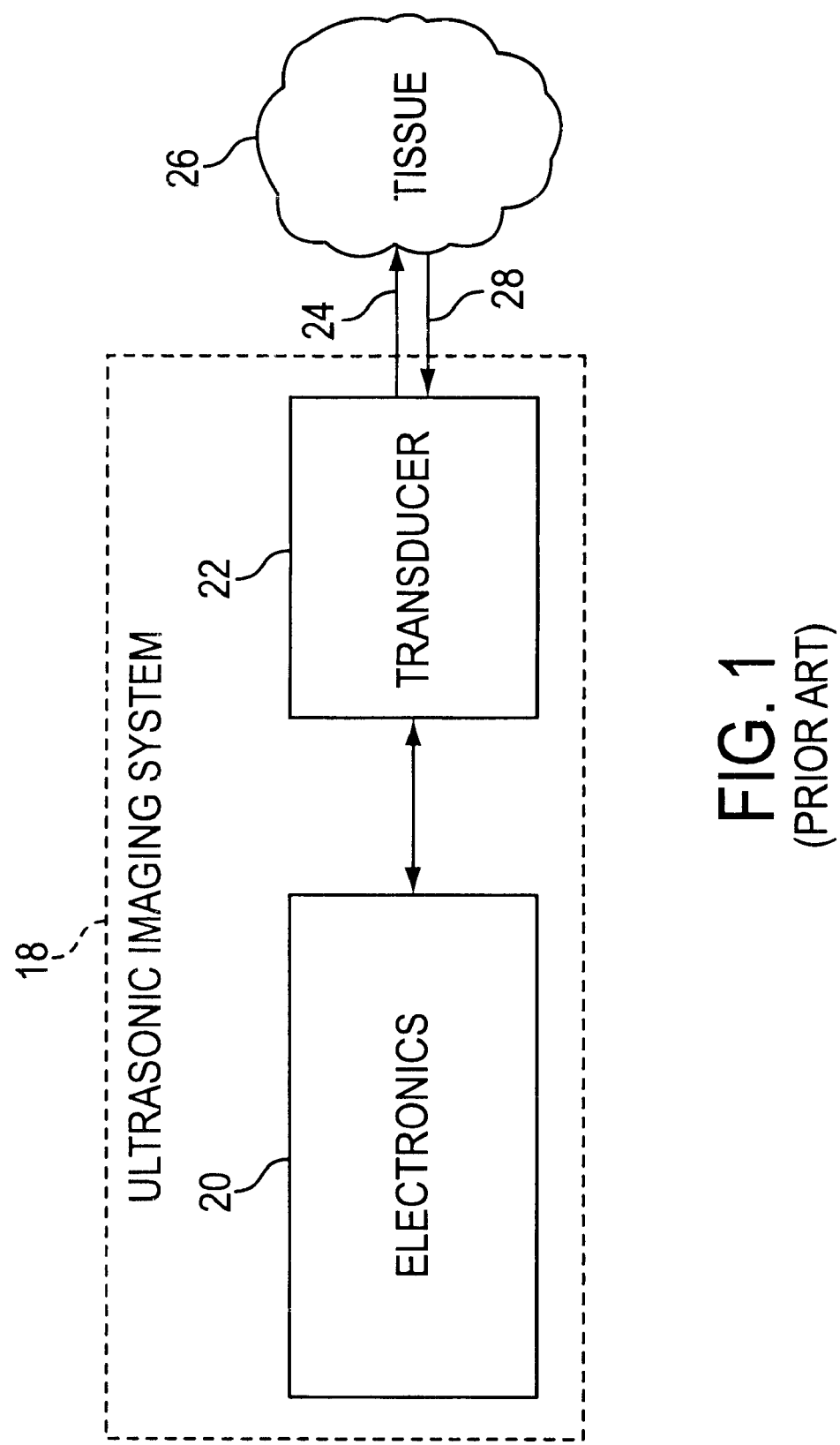
FIG. 1 (prior art) is a diagram illustrating the general concept of an ultrasonic imaging system.

Reference will now be made in detail to the present preferred embodiments of the present invention, examples of which are illustrated in the accompanying drawings, wherein like reference numerals refer to like elements throughout.

Figure 2:
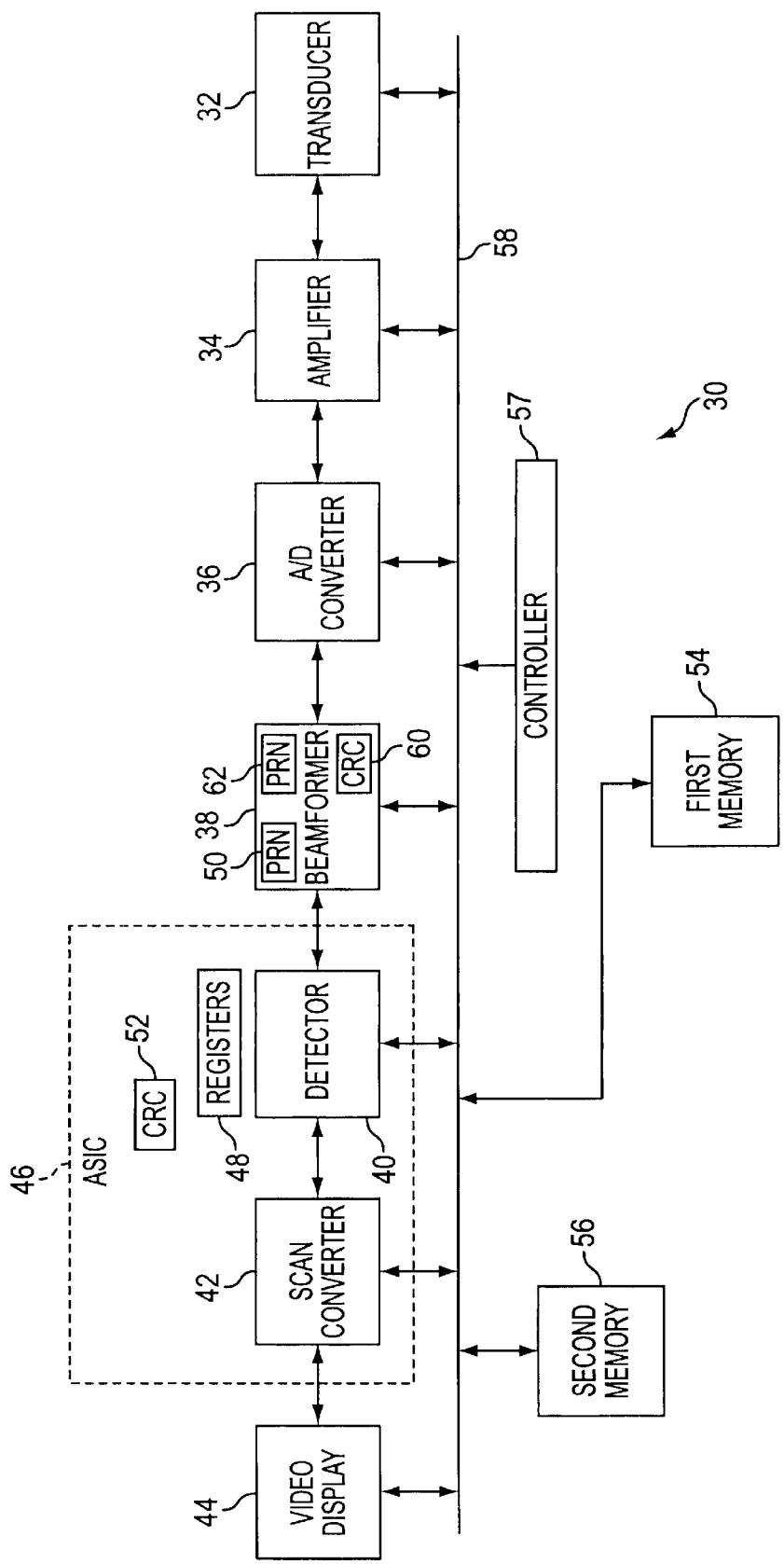
FIG. 2 is a diagram illustrating an ultrasonic imaging system, according to an embodiment of the present invention.

FIG. 2 is a diagram illustrating an ultrasonic imaging system 30, according to an embodiment of the present invention. Ultrasonic imaging system 30 includes a transducer 32, an amplifier 34, an analog-to-digital (A/D) converter 36, a beamformer 38, a detector 40, a scan converter 42 and a video display 44. In FIG. 2, a single amplifier and a single A/D converter are shown to simplify the explanation. However, in a typical embodiment, a separate amplifier and a separate A/D converter would typically be provided for each channel. Transducers, amplifiers, A/D converters, beamformers, detectors, scan converters and video displays are well-known components in the art of ultrasonic imaging systems, and the use of such components in an ultrasonic imaging system to transmit ultrasonic energy into tissue and receive a generated signal is well-known. Therefore, a detailed discussion of these components will not be presented here.

In the embodiment of FIG. 2, detector 40 and scan converter 42 are included in the same application specific integrated circuit (ASIC) 46. ASIC 46 would typically include registers 48 for storing data by ultrasonic imaging system 30 when generating ultrasonic energy or receiving a generated signal.

Beamform 38 includes PRN generators (PRN) 50 and 62 which generate random sequences for use as test stimulus. Typically, PRN generator 50 would generate a different word size than PRN generator 62, but the present invention is not limited to this example. In this embodiment of the present invention, beamformer 38 also includes a built-in cyclic redundancy coding (CRC) checker 60. In a typical embodiment of the present invention, beamformer 38 would be formed by an ASIC which includes built-in PRN generators 50 and 62, and CRC checker 60.

In the embodiment of FIG. 2, ASIC 46 also includes a built-in cyclic redundancy coding (CRC) checker 52. CRC checker 52 provides a unique value for a given digital output pattern from data generated by PRN generator 50 of beamformer 38.

In the specific embodiment of FIG. 2, PRN generator 50 and CRC checker 52 are used to test a receive digital signal path passing through the output of beamformer 38 and then detector 40. As an example, PRN generator 50 generates random numbers as output data from beamformer 38.

Therefore, instead of using digital data from an actual ultrasonic scan, "test" data is generated by PRN generator 50. After the generated test data passes through the output of beamformer 38 and detector 40, CRC checker 52 performs a check of the data. Generally, CRC checker 52 provides a thorough check of the data output from the receive digital signal path.

PRN generators and CRC checkers are well-known in the art, and are commonly used for testing purposes. Therefore, the above-described use of PRN generator 50 and CRC checker 52 would be understood by a person of skill in the art.

As indicated above, in this example, ASIC 46 includes detector 40, scan converter 42, CRC checker 52 and registers 48. Moreover, beamformer 38 is not included in ASIC 46 and is instead formed, for example, by at least one separate ASIC. However, the present invention is not limited to such specific components being included on specific ASICs, or to this specific separation of functionality on different ASICs. Instead, there are many different combinations of components that can be included on different ASICs, and different combinations of ASICs that can be used. Further, the concept of designing an ASIC to include specific components is well-understood in the art, and many different ASICs are typically used in ultrasonic imaging systems, with different ASICs including different components. In the present invention, building PRN generators and CRC checkers into the ASICs allows testing at normal operating speeds at less than, for example, three seconds, and still provides comprehensive testing.

In FIG. 2, ultrasonic imaging system 30 includes, for example, a first on-board memory (FIRST MEMORY) 54 and a second on-board memory (SECOND MEMORY) 56 having a faster access time than first on-board memory 54. First on-board memory 54 might be, for example, flash memory which retains data when powered OFF. A drawback to flash memory is that it is relatively slow and read access only. Therefore, second on-board memory 56 might be, for example, a non-flash memory having a faster access speed and which allows both read/write operations. Run-time code resides, for example, in first on-board memory 54. In this embodiment, when performing ultrasonic imaging, run-time code is copied from first on-board memory 54 into second on-board memory 56. Therefore, run-time code can be accessed from the faster, second on-board memory 56.

An input/output (I/O) controller 57 controls input/output (I/O) operations to/from the various components, and generates a real-time clock. Controllers, and the use of such controllers in ultrasonic imaging systems, are well-known.

A bus 58 connects the various components. The specific bus structure and connection between the various components shown in FIG. 2 is only intended as an example, and the present invention is not limited to this specific bus structure and connection structure.

Generally, the "front-end" of ultrasonic imaging system 30 refers to A/D converter 36 and all components in front of A/D converter 36. Thus, the front-end includes the path from transducer 32 to A/D converter 36. More specifically, the front-end includes, for example, transducer 32, amplifier 34 and A/D converter 36, and generally refers to the analog components. By contrast, the "back-end" refers to all the components in back of A/D converter 36. More specifically, the back-end includes, for example, beamformer 38, detector 40, scan converter 42 and video display 44, and generally refers to the digital components.

Figure 3:
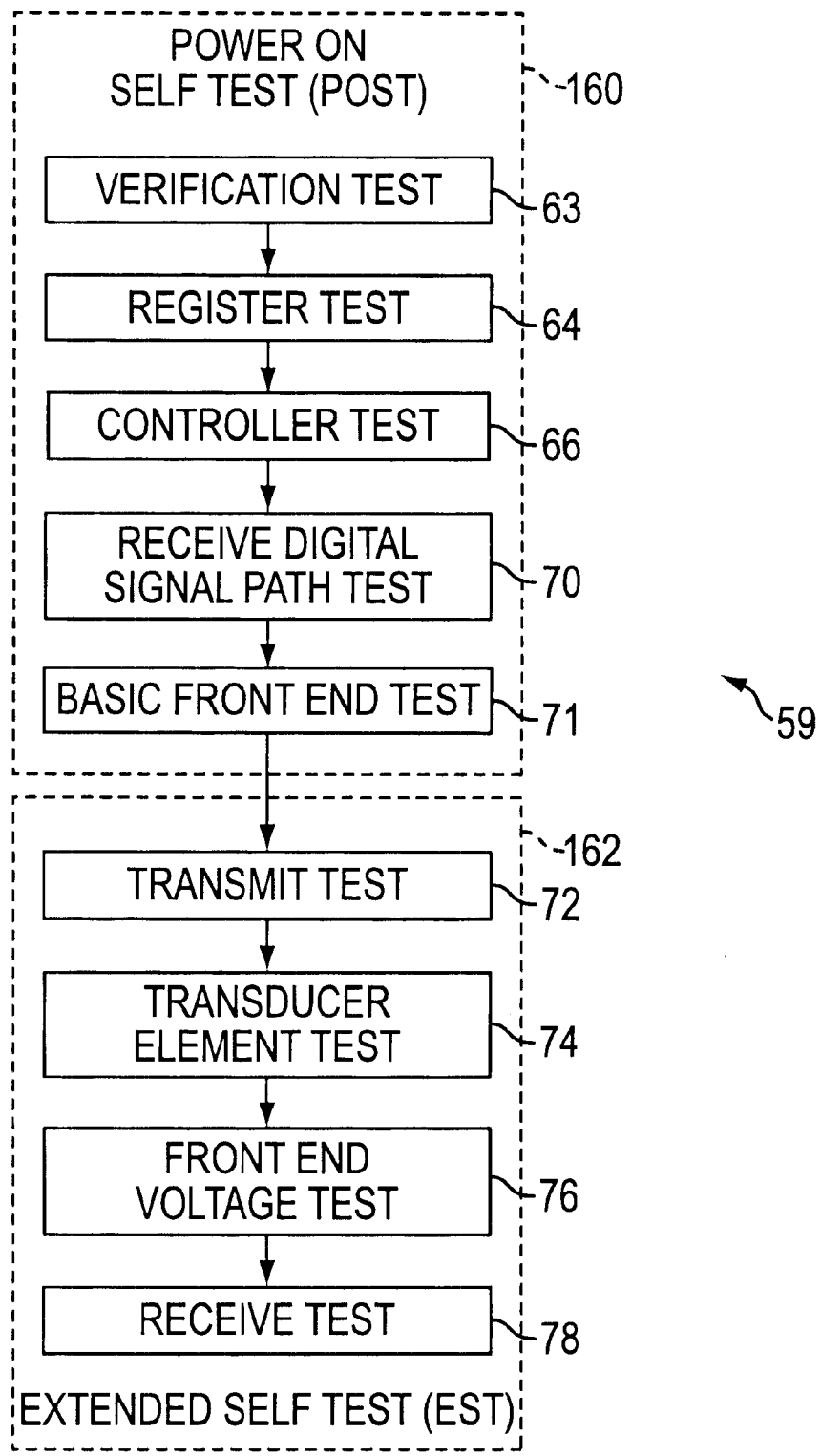
FIG. 3 is a diagram illustrating a diagnostic system which includes a power on self test (POST) and an extended self test (EST) performed by an ultrasonic imaging system, according to an embodiment of the present invention.

FIG. 3 is a diagram illustrating a diagnostic system 59 which includes a power on self test (POST) 160 and an extended self test (EST) 162 performed by ultrasonic imaging system 30, according to an embodiment of the present invention.

Referring now to FIG. 3, POST 160 is performed automatically by ultrasonic imaging system 30 when the system is powered ON and, in this example, runs in less than three seconds with a comprehensive test of the system.

POST 160 includes a verification test 63, a register test 64, a controller test 66, a receive digital signal path test 70 and a basic front end test 71.

Verification test 63 copies run-time code from first on-board memory 54 to second on-board memory 56 and verifies that the copied run-time code has been copied correctly by, for example, performing a checksum of the copied code and comparing this to a predetermined checksum. Of course, this is only an example of a possible verification test, and the present invention is not limited to this specific example. There are many different manners in which to perform a verification test, and the present invention is not limited to any particular manner.

Register test 64 tests the operation of registers 48 included in ASIC 46. Generally, as an example, register test 64 writes into registers 48 and then reads out the written information to verify that it is accurate. The concept of a register test is well known. Of course, this is only an example of a possible register test, and the present invention is not limited to this specific example. There are many different manners in which to perform a register test, and the present invention is not limited to any particular manner.

In the example of FIG. 3, register test 64 is initiated, performed and completed after completion of verification test 63. However, the present invention is not limited to such an execution order.

Controller test 66 tests the operation of controller 57. For example, controller test 66 writes to, and then reads from, registers (not illustrated) of controller 57 to verify proper register operation. Controller test 66 also tests, for example, the real-time clock generated by controller 57 to ensure proper operation. It is well-known how to test a controller and a real-time clock. Moreover, this is only one example of a possible controller test 66. However, the present invention is not limited to this example. Instead, controller test 66 should simply test appropriate controller parameters within a time allotted for completion of POST 160.

In the example of FIG. 3, controller test 66 is initiated, performed and completed after completion of register test 64. However, the present invention is not limited to such an execution order.

Receive digital signal path test 70 is run, for example, at the normal system operating frequency, thus providing an extensive set of functional verification tests in a minimum time (for example, less than 100 µs). The testing is preferably done in a hierarchical manner for the functional blocks within the various ASICs as well as for the interconnections. If the expected CRC value is not obtained a failure is detected and noted.

More specifically, as indicated above, a receive digital signal path during ultrasonic scanning passes through beamformer 38, then detector 40 and then scan converter 42. In the present example, each ASIC forming beamformer 38 includes, for example, two PRN generators (such as PRN generators 50 and 62), and one CRC checker (such as CRC checker 60), although the present invention is not limited to this specific example and many variations are possible. For receive digital signal path test 70, the PRN generators generate, for example, pseudo random but predictable numbers of different widths to accommodate the data they are presenting. PRN generator 62 generates, for example, data that represents the input data from each channel's A/D converter into beamformer 38. PRN generator 50 generates, for example, data that represents the output of beamformer 38 which is input data into detector 40. The output data from beamformer 38 using PRN generator 62 would typically not, for example, provide true full width random numbers. CRC checker 60 checks the output from beamformer 38, and CRC checker 52 checks the output from detector 40. Using two PRN generators allows testing of beamformer 38 and detector 40 in parallel, to thereby save time.

As an example, as described above for the specific embodiment of FIG. 2, in receive digital signal path test 70, PRN generator 50 generates random numbers as output data from beamformer 38. Therefore, instead of using digital data from an actual ultrasonic scan, "test" data is generated by PRN generator 50. After the generated test data passes through the output of beamformer 38 and detector 40, CRC checker 52 performs a check of the data.

Of course, the specific use and number of PRN generators described herein is only intended to be an example, and the present invention is not limited to this specific example. Instead, many variations are possible.

In the example of FIG. 3, receive digital signal path test 70 is initiated, performed and completed after completion of controller test 66. However, the present invention is not limited to such an execution order.

Basic front end test 71 tests a receive path through the front end. This is a basic front end test which tests some, but not all, of the parameters and components of the front end. Therefore, front end test 71 provides for a quick, but not totally comprehensive, test of the front end to be performed during POST 160. For example, a test signal could be injected into all channels of amplifier 34. Amplifier 34 then, for example, filters and adds a linearly increasing time gain control (TGC) while a line of data is received. The summed data from beamformer 38 is then analyzed to verify that the receive path of all channels and the TGC are functioning correctly. In this example, it is assumed that amplifier 34 includes the required filters, etc., for performing such operation. Amplifier 34 might be, for example, an ASIC having the required functionality. This is only one example of a possible basic front end test 71 which can be performed during POST 160. However, the present invention is not limited to this example. Instead, basic front end test 71 should simply be designed to test appropriate front end parameters and components within a time allotted for completion of POST 160.

In the example of FIG. 3, basic front end test 71 is initiated, performed and completed after completion of receive digital signal path test 70. However, the present invention is not limited to such an execution order.

The above-described order in which the various tests of POST 160 are performed is simply intended as an example, and the present invention is not limited to this order. Thus, the various tests of POST 160 might be performed in a different order. However, the above-described order in which the various tests of POST 160 are performed is designed so that components required for subsequent tests are tested first. For example, receive digital signal path test 70 would typically require components tested in verification test 63 and register test 64, and is therefore run subsequent to these tests.

At the completion of POST 160, ultrasonic imaging system 30 is, for example, ready to perform ultrasonic scanning without requiring additional diagnostic tests for this purpose.

EST 162 is performed after POST 160 at the discretion of an operator. EST 162 includes a transmit test 72, a transducer element test 74, a front end voltage test 76 and a receive test 78.

Transmit test 72 tests the transmission of ultrasonic energy. Components of the front-end which are not illustrated but which might be tested by transmit test 72 include, for example, output pulsers, pulse generators and a high voltage power supply. As an example, for these components, transmit test 72 measures various parameters such as, for example, pulse width, number of pulses and pulse amplitude. If the response is significantly different from the expected response, then the element/interconnect set is, for example, tagged as defective, and its array location is noted. There are many different transmit tests which can be used, and the present invention is not limited to any specific test. The concept of a transmit test is well-known.

Transducer element test 74 checks the transducer elements and interconnects (e.g., cables, connectors) of transducer 32. To perform transducer element test 74, transducer 32 would typically be required to be plugged in to the associated electronics. As an example of a possible transducer test, transducer 32 could be held in free air, with a pulse being sent out through transducer 32. The response of each element/interconnect set would then be measured. The response of each element/interconnection set is then compared to a known "thumbprint" response. If the response is similar to the thumbprint, then that element/interconnect set is determined to be operating correctly. If the response is significantly different from the expected response, then the element/interconnect set is, for example, tagged as defective, and its array location is noted. Of course, this is only one example of a possible transducer element test 74, and the present invention is not limited to this specific example. Instead, other appropriate transducer element tests can be used. The concept of a transducer element test is well-known.

Front end voltage test 76 verifies that certain voltages in the front end of the ultrasonic imaging system are within certain limits. The voltages are, for example, multiplexed to an A/D converter, which is read by a processor to determine if they are within the limits or not. The concept of a front end voltage test is well-known, and the present invention is not limited to any specific test.

Receive test 78 tests the receive paths of front-end channels. For example, receive test 78 measures various parameters of the front-end such as, for example, gain, phase, noise and harmonic distortion. These measurements are made by, for example, injecting a test signal from an on-board direct digital synthesizer (see, for example, direct digital synthesizer 98 in FIG. 4) into each channel. Then, for example, a Fourier transform (FFT) can be performed on the beamform data to compute these parameters. If the response is significantly different from the expected response, then the element/interconnect set is, for example, tagged as defective, and its array location is noted. Of course, this is only one example of a possible receive test 78, and the present invention is not limited to this specific example. Instead, other appropriate receive tests can be used. The concept of a receive test is well-known.

As an example of the execution order of the various tests in EST 162, transducer element test 74 is initiated, performed and completed after completion of transmit test 72. Front end voltage test 76 is initiated, performed and completed after completion of transducer element test 74. Receive test 78 is initiated, performed and completed after completion of front end voltage test 76. However, this order in which the various tests of EST 162 are performed is simply intended as an example, and the present invention is not limited to this order. Thus, the various tests of EST 162 might be performed in a different order. Generally, the tests should be performed in an appropriate order so that components required for subsequent tests are tested first.

As an example, at the end of EST 162, a bit pattern is displayed for transmit test 72, receive test 78 and transducer element test 74, indicating possible bad channels. With further analysis of the results, it can be determined, for example, if the fault is in transducer 32, or in other electronics. However, the present invention is not limited to including such a bit pattern display and analysis.

Generally, as an example, the run time software would control the execution of both POST 160 and EST 162, as well as, for example, the periodic monitoring of system parameters.

With the above-described structure, ultrasonic imaging system 30 may be able to provide continuous periodic monitoring of various system parameters (such as, for example, transmit parameters, temperature, etc) during normal system operation.

As can be seen from FIG. 3, diagnostic tests are organized with a methodology in which the tests are grouped and run with timing and a frequency that depends upon their criticality and duration. For example, system diagnostics, which are embedded in the run time code, are conducted either every time the system is turned ON during POST 160, or at the operator's convenience during EST 162. This test methodology thus allows full system testing at an operator's convenience and adequate, speedy system testing by a reduced set of diagnostics at power ON.

As an example, an operator might be able to initiate EST 162 by hitting several keys in a prescribed manner, or pressing a specific button or key. However, the present invention is not limited to this example, and there are many different manners in which an operator could initiate EST 162. Moreover, as an example, the operator might not normally run EST 162 on his/her own. Instead, as an example, the operator might run EST 162 with telephonic assistance of a technical support. Of course, this manner of running EST 162 is only intended as an example, and the present invention is not limited to this example.

While it would be desirable to conduct several diagnostic tests at power ON, it would be undesirable to have a lengthy delay before ultrasonic imaging system 30 is operational after power ON. This is essential on a portable ultrasonic system, where a satisfactory delay to an operator would be approximately three (3) seconds. The specific tests and structure of the tests in POST 160 deliver test coverage of the major functional components of ultrasonic imaging system 30 within the three (3) second limit, while providing the operator with a high degree of confidence in the "well being" of ultrasonic imaging system 30. In the specific examples described herein, less critical tests and tests that would take longer than three (3) seconds are conducted in EST 162.

Therefore, the various tests of POST 160 and EST 162 are organized in a hierarchical manner that corresponds to the architecture of ultrasonic imaging system 30.

Moreover, the above-described embodiments of the present invention provide a hierarchical testing structure with a PRN generator and a CRC checker built into the hardware. Such built-in use of a PRN generator and a CRC checker can provide significant advantages. For example, conventionally, in ultrasonic imaging systems, digital circuit testing is conducted with a probe and a signal analyzer using a method known in the art as Digital Signature Analysis (DSA). The probe is touched on a test location on the circuit board or integrated chip (IC), and, with the appropriate clocking and gating, its output is input to the signal analyzer to ensure that the signal is performing properly. However, probe testing is slow and resource intensive. Such probe testing is normally useful only in the factory and cannot be conducted every time that a system is powered ON. In addition, in order to conduct the test, the probe needs to be mechanically placed on selected nodes of a circuit. Thus, probe testing requires access to test locations on the subject board/chip. When an ultrasonic imaging system has many system components integrated into ASICs, the board itself is so dense with components that probe sites are not easy to access. In addition, many of the actual nodes that need to be tested are buried within the board. Therefore, test access to many of the nodes is impossible.

However, in an ultrasonic imaging system according to the present invention, various back-end ASICs (such as, for example, ASIC 46 and those forming beamformer 38) may not need to be probe tested. Instead, PRN generators 50 and 62 and CRC checkers 52 and 60 are built in to ASICs (such as ASICs 46, and those forming beamformer 38), and used to verify the functionality of the back-end ASICs and the interconnections between the ASICs. Therefore, at power ON during POST 160, the back-end ASICs can be tested by receive digital signal path test 70.

Ultrasonic imaging system 30 might also, for example, provide a microprocessor that creates a log in memory to record errors entered during POST 160 and EST 162. The error log might then be read from memory and viewable on a display during EST 162 so that an operator can diagnose what has gone wrong. However, such log creation is only an example of possible operation provided by ultrasonic imaging system 30, and the present invention is not limited to creating such a log.

Figure 4:
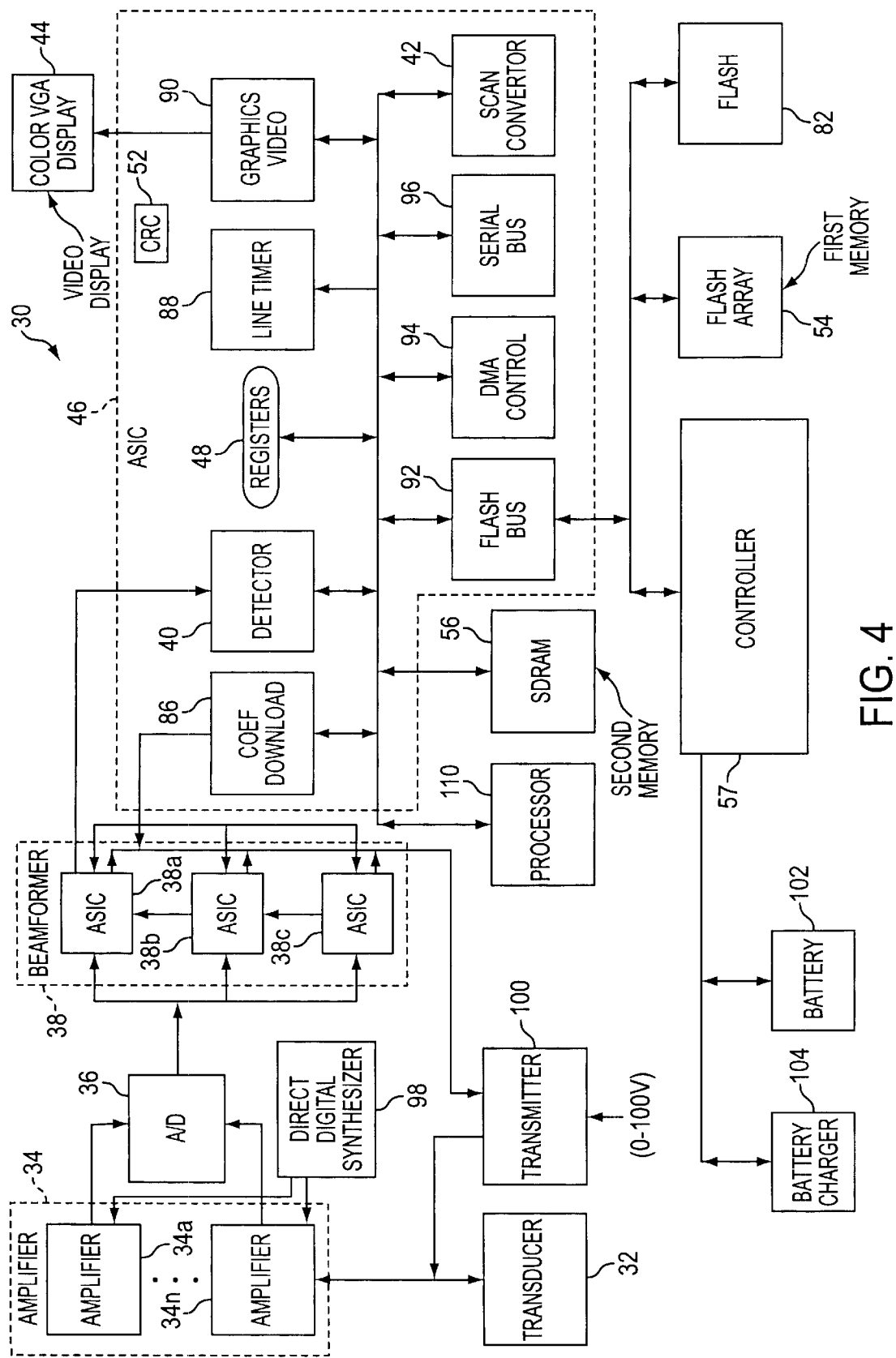
FIG. 4 is a detailed diagram of an ultrasonic imaging system, according to an embodiment of the present invention.

FIG. 4 is a more detailed diagram of ultrasonic imaging system 30, according to an embodiment of the present invention. Various components in FIG. 4 correspond to those in FIG. 2. For example, in FIG. 4, video display 44 is shown as being a color VGA display, first memory 54 is shown as being a flash array, second memory 56 is shown as being an SDRAM.

Moreover, FIG. 4 shows further details of the various major components in FIG. 2. For example, in FIG. 4, amplifier 34 is shown as including a plurality of individual amplifiers 34a through 34n. As an example, a respective amplifier 34a through 34n might provide amplification for different channels of transducer 32. Of course, this embodiment of amplifier 34 is only intended as an example, and the present invention is not limited to this embodiment.

In FIG. 4, beamformer 38 is shown as including ASICs 38a, 38b and 38c which together provide beamformer functionality. Although not shown in FIG. 4, each ASIC 38a, 38b and 38c would include PRN generators 50 and 62, and CRC checker 60, similar to that shown in FIG. 2. Of course, this embodiment of beamformer 38 is only intended as an example, and the present invention is not limited to this embodiment.

In FIG. 4, ASIC 46 includes a coefficient downloader (COEF DOWNLOAD) 86 which downloads coefficients for ASICS 38a, 38b and 38c of beamformer 38, a line timer 88, a video graphics interface (GRAPHICS VIDEO) 90, a flash bus 92, a direct memory access (DMA) controller (DMA CONTROL) 94 and a serial bus 96, in addition to detector 40, scan converter 42, registers 48 and CRC checker 52.

Generally, DMA controller 94 controls movement of data between second memory (SDRAM) 56, detector 40 and scan converter 42. DMA controllers are well-known. Generally, line timer 88 controls timing within ASIC 46. Line timers are well-known.

Of course, the specific components included in ASIC 46 are only intended as a example, and the present invention is not limited to this example.

FIG. 4 also shows a programmable direct digital synthesizer 98 which could be used, for example, to perform basic front end test 71 of POST 160 and transducer element test 74 and receive test 78 in EST 162. For example, a test signal from direct digital synthesizer 98 is injected into all channels. Amplifier 34 filters and adds a linearly increasing time gain control (TGC) while a line of data is received. The summed data from beamformer 38 is then analyzed to verify that the receive path of all channels and the TCG are functioning correctly. Direct digital synthesizers are well-known. However, the present invention is not limited to the use of a direct digital synthesizer for front-end testing.

FIG. 4 also shows a transmitter 100, a battery 102, a battery charger 104 and a processor 110. In FIG. 4, controller 57 might be, for example, an SMC ULTRA I/O CONTROLLER.

Each of the various components and interconnections in FIG. 4 would be well-understood by a person of skill in the art.

Post 160 and EST 162 would reside in software code stored in ultrasonic imaging system 30. For example, such code might reside, for example, in first on-board memory 54. However, the present invention is not limited to such code being stored in any particular location. Moreover, such code would be run by a processor, such as processor 110. However, the present invention is not limited to such code being run on any specific processor at any specific location within ultrasonic imaging system 30.

The specific configurations in FIGS. 2 and 4 are only intended as examples. Of course, the present invention is not limited to these examples, and many variations are possible. Moreover, the present invention is not limited to the specific types of memories (e.g., flash, SDRAM) described herein, and other types of memories may be used, such as additional flash memory 82. Moreover, the present invention is not limited to the specific types of buses (e.g., serial) described herein, and other types of buses, and bus structures, can be used.

As an example, in FIGS. 2 and 4, beamformer 38 is shown as being separate from ASIC 46. However, as an example, the various components in beamformer 38 and ASIC 46 could have been included together on the same ASIC.

In various of the above embodiments of the present invention, testing for POST 160 and EST 162 is built into ultrasonic imaging system 30. Generally, no external testing equipment is required to perform the testing. However, the present invention is not limited in this manner. Instead, for example, in some embodiments, it is possible that various tests would allow for the use of external testing equipment.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An ultrasonic imaging system comprising:
   a first on-board memory storing run-time code;
   a second on-board memory having a faster access time than the first on-board memory;
   a first application specific integrated circuit (ASIC) including a beamformer, first and second built-in pseudo-random number (PRN) generators, and a first built-in cyclic redundancy coding checker, and
   a second application specific integrated circuit (ASIC) including a detector and a second built-in cyclic redundancy coding (CRC) checker; and
   a power on self test (POST) which is initiated, performed and completed within three seconds of power ON, wherein the run-time code is configured to perform the POST and ultrasonic scanning with said ultrasonic imaging system, further wherein the POST includes a verification test for copying the run-time code from the first on-board memory to the second on-board memory enabling access to the run-time code from said faster second on-board memory, the verification test further for verifying that the copied run-time code has been copied correctly, and wherein a receive digital signal path during ultrasonic scanning passes through the beamformer and then the detector, wherein the POST further including a receive digital signal path test in which the first PRN generator and first CRC checker operate with the second PRN generator and second CRC checker to test an output of the beamformer and an output of the detector of the receive digital signal path, respectively, in parallel.

2. The ultrasonic imaging system as in claim 1, wherein, after completion of the POST, further diagnostic tests are not required for the ultrasonic imaging system to perform ultrasonic scanning.

3. The ultrasonic imaging system as in claim 1, further comprising:
   a back-end application specific integrated circuit (ASIC) including registers to perform ultrasonic scanning, the POST including a register test to test the registers, the register test being initiated, performed and completed after completion of the verification test.

4. The ultrasonic imaging system as in claim 3, wherein the ultrasonic imaging system further comprises a controller generating a real-time clock and controlling input/output operations during ultrasonic scanning, the POST including a controller test testing operation of the controller, the controller test being initiated, performed and completed after completion of the register test.

5. The ultrasonic imaging system as in claim 4, wherein the receive digital signal path test is initiated, performed and completed after completion of the controller test.

6. The ultrasonic imaging system as in claim 5, wherein the POST includes a basic front end test which is initiated, performed and completed after completion of the receive digital signal path test.

7. The ultrasonic imaging system as in claim 1, further comprising an extended self-test (EST) performed at the discretion of an operator after completion of the POST, the EST including at least one of the group consisting of a transmit test, a transducer element test, a front end voltage test and a receive test.

8. The ultrasonic imaging system as in claim 1, further comprising an extended self-test (EST) performed at the discretion of an operator after completion of the POST, the EST including a transmit test, a transducer element test, a front end voltage test and a receive test.

9. The ultrasonic imaging system as in claim 1, further comprising an extended self-test (EST) performed at the discretion of an operator after completion of the POST, the EST including

- a transmit test,
- a transducer element test which is initiated, performed and completed after completion of the transmit test,
- a front end voltage test which is initiated, performed and completed after completion of the transducer element test, and
- a receive test which is initiated, performed and completed after completion of the front end voltage test.

10. An ultrasonic imaging system comprising:

- a first on-board memory storing run-time code;
- a second on-board memory having a faster access time than the first on-board memory, the run-time code being moved from the first on-board memory to the second on-board memory to perform ultrasonic scanning;
- a first application specific integrated circuit (ASIC) including a beamformer, first and second built-in pseudo-random number (PRN) generators, and a first built-in cyclic redundancy coding checker, and
- a second application specific integrated circuit (ASIC) including a detector and a second built-in cyclic redundancy coding (CRC) checker; and
- a power on self test (POST) including a verification test which copies the run-time code from the first on-board memory to the second on-board memory and verifies that the copied run-time code has been copied correctly, wherein the run-time code is configured to perform the POST and ultrasonic scanning, and wherein copying the run-time code from the first on-board memory to the second on-board memory enables access to the run-time code from the faster second on-line memory, and wherein a receive digital signal path during ultrasonic scanning passes through the beamformer and then the detector, wherein the POST further including a receive digital signal path test in which the first PRN generator and first CRC checker operate with the second PRN generator and second CRC checker to test an output of the beamformer and an output of the detector of the receive digital signal path, respectively, in parallel.

11. The ultrasonic imaging system as in claim 10, further comprising:

- a back-end application specific integrated circuit (ASIC) including registers to perform ultrasonic scanning, the POST including a register test to test the registers, the register test being initiated, performed and completed after completion of the verification test.

12. The ultrasonic imaging system as in claim 11, wherein the ultrasonic imaging system further comprises a controller generating a real-time clock and controlling input/output operations during ultrasonic scanning, the POST including a controller test testing operation of the controller, the controller test being initiated, performed and completed after completion of the register test.

13. The ultrasonic imaging system as in claim 12, wherein the receive digital signal path test being initiated, performed and completed after completion of the controller test.

14. The ultrasonic imaging system as in claim 13, wherein the POST includes a basic front end test which is initiated, performed and completed after completion of the receive digital signal path test.

15. An ultrasonic imaging system comprising:

- a first application specific integrated circuit (ASIC) including a beamformer, first and second built-in pseudo-random number (PRN) generators, and a first built-in cyclic redundancy coding checker, and
- a second application specific integrated circuit (ASIC) including a detector and a second built-in cyclic redundancy coding (CRC) checker; and
- a power on self test (POST) including
    - a verification test for copying run-time code from a first on-board memory to a second on-board memory and verifying that the copied run-time code has been copied correctly, the second on-board memory having a faster access time than the first on-board memory, and wherein the run-time code is configured to perform the POST and ultrasonic scanning,
    - a register test testing registers included in an application specific integrated circuit (ASIC) for performing ultrasonic scanning according to the run-time code,
    - a controller test testing operation of a controller which generates a real-time clock and controls input/output operations during ultrasonic scanning according to the run-time code,
    - a receive digital signal path test testing a receive digital signal path between a beamformer and a detector of the ultrasonic imaging system according to the run-time code, and
    - a basic front end test for testing a receive path through an analog front end of the ultrasonic imaging system according to the run-time code, wherein the receive digital signal path test includes the first PRN generator and first CRC checker configured to operate with the second PRN generator and second CRC checker to test an output of the beamformer and an output of the detector of the receive digital signal path, respectively, in parallel.

16. The ultrasonic imaging system as in claim 15, wherein the POST initiates, performs and completes within three seconds of power ON.

17. The ultrasonic imaging system as in claim 15, further comprising:

- an extended self-test (EST) performed at the discretion of an operator after completion of the POST, the EST including at least one of the group consisting of a transmit test, a transducer element test, a front end voltage test and a receive test.

18. The ultrasonic imaging system as in claim 15, further comprising:

- an extended self-test (EST) performed at the discretion of an operator after completion of the POST, the EST including a transmit test, a transducer element test, a front end voltage test and a receive test.

19. The ultrasonic imaging system as in claim 15, further comprising:

- an extended self-test (EST) performed at the discretion of an operator after completion of the POST, the EST including
    - a transmit test,
    - a transducer element test which is initiated, performed and completed after completion of the transmit test,
    - a front end voltage test which is initiated, performed and completed after completion of the transducer element test, and
    - a receive test which is initiated, performed and completed after completion of the front end voltage test.

20. An ultrasonic imaging system comprising:

- a first application specific integrated circuit (ASIC) including a beamformer, first and second built-in pseudo-random number (PRN) generators, and a first built-in cyclic redundancy coding checker, and a second application specific integrated circuit (ASIC) including a detector and a second built-in cyclic redundancy coding (CRC) checker;

means for initiating, performing and completing a power on self test (POST) for the ultrasonic imaging system within three seconds of power ON, said POST means including a first on-board memory storing run-time code, a second on-board memory having a faster access time than the first on-board memory, wherein the run-time code is configured for performing said POST and ultrasonic scanning, said POST means further including a verification test, the verification test for copying the run-time code from the first on-board memory to the second on-board memory, enabling access to the run-time code from the faster second on-board memory, wherein the verification test is further for verifying that the run-time code has copied correctly; and means for performing an extended self test (EST) after completion of the POST, wherein a receive digital signal path during ultrasonic scanning passes through the beamformer and then the detector, wherein the POST further includes a receive digital signal path test in which the first PRN generator and first CRC checker operate with the second PRN generator and second CRC checker to test an output of the beamformer and an output of the detector of the receive digital signal path, respectively, in parallel.

21. An ultrasonic imaging system comprising:

a first on-board memory storing run-time code;

a second on-board memory having a faster access time than the first on-board memory;

a first application specific integrated circuit (ASIC) including a beamformer, first and second built-in pseudo-random number (PRN) generators, and a first built-in cyclic redundancy coding checker, and a second application specific integrated circuit (ASIC) including a detector and a second built-in cyclic redundancy coding (CRC) checker;

a power on self test (POST) which is initiated, performed and completed within three seconds of power ON, the POST including at least one of the group consisting of a verification test, a register test, a controller test, a receive digital signal path test and a basic front end test, wherein the run-time code is configured for performing the POST and ultrasonic scanning, and wherein the verification test is configured for copying the run-time code from the first on-board memory to the second on-board memory, enabling access to the run-time code from the faster second on-board memory, wherein the verification test is further for verifying that the run-time code has copied correctly; and an extended self-test (EST) performed at the discretion of an operator after completion of the POST, the EST including at least one of the group consisting of a transmit test, a transducer element test, a front end voltage test, and a receive test, further wherein a receive digital signal path during ultrasonic scanning passes through the beamformer and then the detector, wherein the POST further includes a receive digital signal path test in which the first PRN generator and first CRC checker operate with the second PRN generator and second CRC checker to test an output of the beamformer and an output of the detector of the receive digital signal path, respectively, in parallel.

* * * * *